(12) United States Patent
Sado

(10) Patent No.: US 8,503,098 B2
(45) Date of Patent: Aug. 6, 2013

(54) ZOOM LENS FOR PROJECTION AND PROJECTION-TYPE DISPLAY APPARATUS

(75) Inventor: Kenzo Sado, Saitama (JP)

(73) Assignee: Fujifilm Corporation, Tokyo (JP)

( * ) Notice: Subject to any disclaimer, the term of this patent is extended or adjusted under 35 U.S.C. 154(b) by 99 days.

(21) Appl. No.: 13/095,401

(22) Filed: Apr. 27, 2011

(65) Prior Publication Data

US 2011/0267704 A1 Nov. 3, 2011

(30) Foreign Application Priority Data

Apr. 28, 2010 (JP) .................................. 2010-104448

(51) Int. Cl.
*G02B 15/14* (2006.01)

(52) U.S. Cl.
USPC .......................................... 359/686; 359/681

(58) Field of Classification Search
USPC .......................... 359/676, 681, 684, 686, 715
See application file for complete search history.

(56) References Cited

U.S. PATENT DOCUMENTS

| | | | |
|---|---|---|---|
| 6,204,976 B1 | 3/2001 | Nagahara | |
| 2007/0263294 A1* | 11/2007 | Yamada et al. | 359/680 |

FOREIGN PATENT DOCUMENTS

| | | |
|---|---|---|
| JP | 2006-039033 | 2/2006 |
| JP | 2006-065026 | 3/2006 |
| JP | 2007-206331 | 8/2007 |

* cited by examiner

*Primary Examiner* — Alicia M Harrington
(74) *Attorney, Agent, or Firm* — Young & Thompson

(57) ABSTRACT

A zoom lens for projection includes a negative first lens group, a positive second lens group, a positive third lens group, and a positive fourth lens group, which are arranged from the magnification side of the zoom lens in the order mentioned above. The first lens group and the fourth lens group are fixed during zooming, but the second lens group and the third lens group move on optical axis Z of the zoom lens toward the magnification side, based on an operation for operating the zoom lens from wide end to tele end, in such a manner that a distance between the second lens group and the third lens group changes. Further, the following formula (1) is satisfied:

$17 < F_{G3}/fw$ (1), where $F_{G3}$: focal length of the third lens group, and
fw: focal length of entire system at wide end.

9 Claims, 10 Drawing Sheets

FIG.3 EXAMPLE 2 (WIDE)

FIG.5 EXAMPLE 3 (WIDE)

EXAMPLE 3

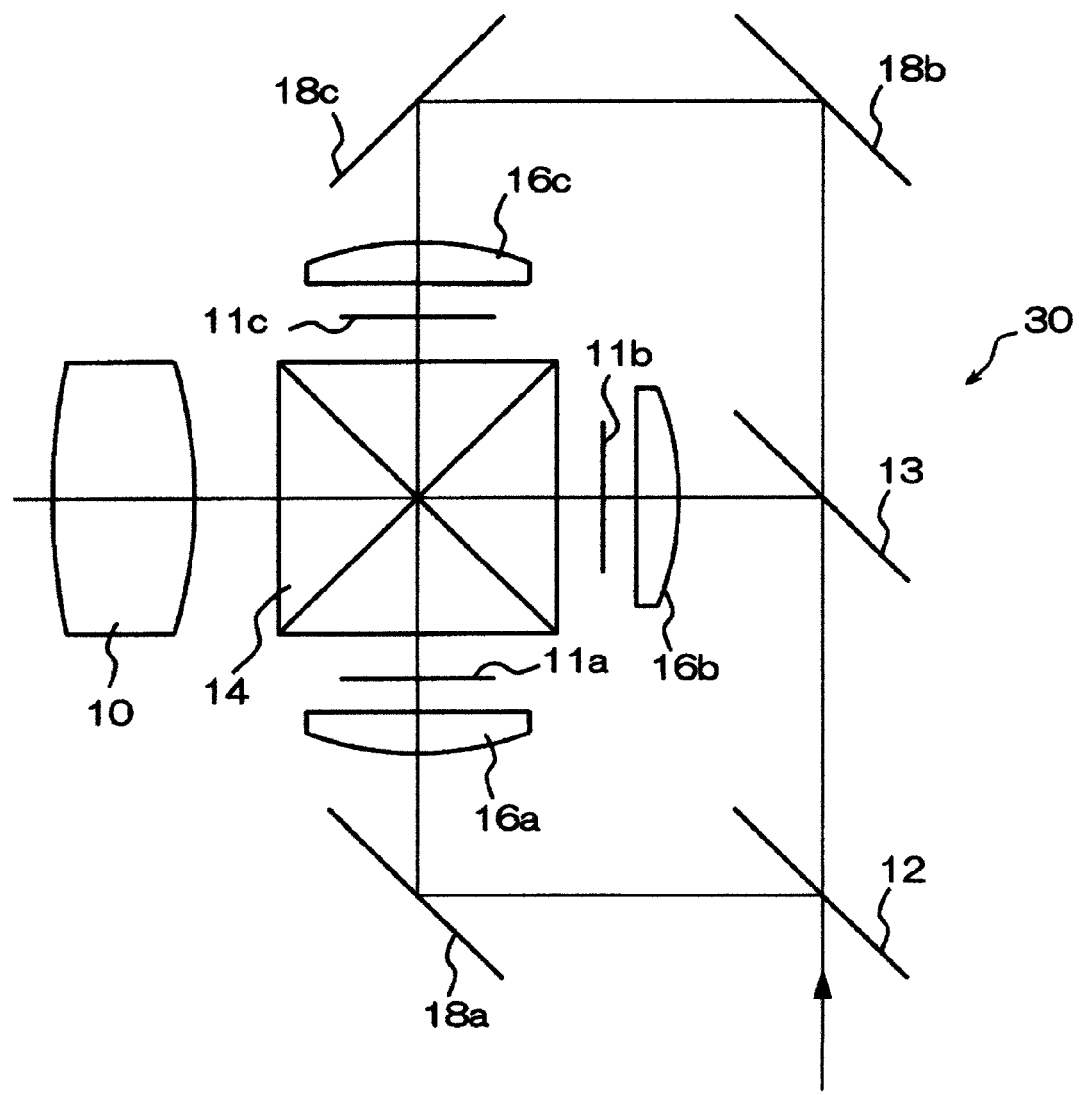
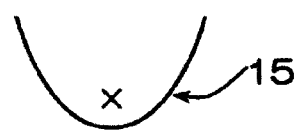
FIG.10

ZOOM LENS FOR PROJECTION AND PROJECTION-TYPE DISPLAY APPARATUS

BACKGROUND OF THE INVENTION

1. Field of the Invention

The present invention relates to a zoom lens for projection used as a projection lens of a projector apparatus or the like. Particularly, the present invention relates to a zoom lens for projection appropriate for a so-called front-type projector apparatus, which magnifies and projects an original image displayed on a light valve, such as a liquid crystal display device, onto a screen, and to a projection-type display apparatus on which the zoom lens for projection is mounted.

2. Description of the Related Art

A so-called front-projection-type projector apparatus, which projects images onto a screen in front of the apparatus, is becoming generally used for school education, company training, presentation, and the like. Further, as the market of projectors matured, the variety of projectors increased, and various projectors, such as a large projector for a large theater screen and a very small projector for a mobile phone, became used.

Meanwhile, in the market of data projection apparatuses, which is the oldest projection apparatus market, a demand for small low-cost projectors having high resolving power that can project high light-intensity images is strong. To satisfy such demand, smaller light valves, such as a liquid crystal display panel (DMD and the like are included, but hereinafter, simply referred to as a liquid crystal display panel or the like), having high resolving power are being developed. Further, a request for development of zoom lenses corresponding to such light valves is strong.

In data projection, projection of data in a light room environment is often requested. Therefore, it is essential that the optical system of a data projection apparatus has a small F-number. However, since display areas of small liquid crystal display panels are small, when rays of light similar to those passing through conventional liquid crystal display panels are tried to be passed through the small display areas, it is necessary to increase the incident angle of rays entering the liquid crystal display panel or the like, or to use a high luminance light source including a light output unit smaller than a conventional light output unit, as well as lowering the F-number of the optical system than a conventional optical system.

However, since further reduction in the size of a light output unit in a high luminance light source tends to be difficult, the aforementioned measures are difficult to be taken. Further, when the size of the liquid crystal display panel or the like is tried to be reduced, the size of a pixel becomes smaller, and it becomes necessary to cope with a higher spatial frequency than a conventional liquid crystal display panel or the like. Consequently, the cost increases.

In this circumstance, zoom lenses for projection that can satisfy the demand for a fast small-size low-cost zoom lens to some extent are known (please refer to U.S. Pat. No. 6,204,976 (Patent Document 1), Japanese Unexamined Patent Publication No. 2006-039033 (Patent Document 2), Japanese Unexamined Patent Publication No. 2006-065026 (Patent Document 3), and Japanese Unexamined Patent Publication No. 2007-206331 (Patent Document 4)). These zoom lenses for projection are so-called two-group-movable zoom lenses, which perform zooming by moving two lens groups. Further, each entire lens system is composed of 6 to 13 lenses.

Patent Documents 1, 3 and 4 disclose zoom lenses for projection with F-numbers exceeding 1.7. Further, Patent Documents 2 through 4 disclose zoom lenses for projection including an aspheric lens, or two or three aspheric lenses.

When the size of the liquid crystal display panel or the like is reduced as described above, the cost of the liquid crystal display panel or the like can be reduced. At the same time, if the size of an illumination system and the size of a lens for projection are reduced, the cost is further reducible.

However, when the intensity of light is tried to be maintained while the size of the liquid crystal display panel or the like is reduced, it is necessary to lower the F-number of the lens for projection (fast lens), and to increase the incident angle of rays entering the liquid crystal display panel or the like or to mount a high luminance light source including a small light output unit, as described above. Therefore, the cost greatly increases.

Further, when the number of movable lens groups for changing magnification is increased to three or greater to lower the F-number of the zoom lens, the cost for production of the lens system greatly increases.

To reduce the cost for production of zoom lenses, the number of lenses in the entire system should be smaller, and the outer diameter of each lens should be smaller. Further, the relative illumination of the lens should be minimized to reduce the outer diameter of the lens, or the like.

However, when the relative luminance is reduced, light energy corresponding to the reduced relative luminance is consumed to increase the temperature of a lens barrel surrounding the lens. Especially, when an aspheric lens made of plastic (the cost is lower than glass) is arranged on the reduction side of a stop, the fluctuation of an image plane and the fluctuation of field curvature or the like caused by the change in temperature become large. Further, a difference between a temperature around the aspheric lens made of plastic arranged on the reduction side of the stop and a temperature around an aspheric lens made of plastic arranged on the magnification side of the stop becomes too large. Further, time periods for returning to steady temperature differ from each other between the two aspheric lenses, which are arranged apart from each other. Therefore, it is difficult to accurately offset the influences of the change in temperature on the two aspheric lenses made of plastic each other.

SUMMARY OF THE INVENTION

In view of the foregoing circumstances, it is an object of the present invention to provide a compact low-cost zoom lens for projection that has a wide projection angle and a small F-number, and which is not easily influenced by a change in temperature, and which can achieve excellent optical performance by using a minimum number of aspheric lenses. Further, it is another object of the present invention to provide a projection-type display apparatus.

To achieve these objects, a zoom lens for projection of the present invention is a zoom lens for projection comprising:

a first lens group having negative refractive power;

a second lens group having positive refractive power;

a third lens group having positive refractive power; and a fourth lens group having positive refractive power, which are arranged from the magnification side of the zoom lens in the order mentioned above, wherein the first lens group and the fourth lens group are fixed during zooming, but the second lens group and the third lens group move on the optical axis of the zoom lens toward the magnification side, based on an operation for operating the zoom lens from wide end to tele end, in such a manner that a distance between the second lens group and the third lens group changes, and wherein the following formula (1) is satisfied:

$$17 < F_{G3}/fw \qquad (1),\text{ where}$$

$F_{G3}$: focal length of the third lens group, and
fw: focal length of entire system at wide end.

It is desirable that the first lens group is composed of a negative first lens, which is an aspheric lens made of plastic, and a negative second lens, which are arranged from the magnification side in the order mentioned above. Further, it is desirable that the second lens group is composed of a positive third lens and a positive fourth lens, which are arranged from the magnification side in the order mentioned above. Further, it is desirable that the third lens group is composed of a fifth lens, which is a negative meniscus lens having a convex surface facing the magnification side, a negative sixth lens having a concave surface facing the magnification side, a positive seventh lens having a convex surface facing the reduction side of the zoom lens, and a positive eighth lens, the fifth through eighth lenses being arranged from the magnification side in the order mentioned above, and that the negative sixth lens and the positive seventh lens are cemented together to form a cemented lens. Further, it is desirable that the fourth lens group is composed of a positive ninth lens.

It is desirable that the following formula (2) is satisfied:

$$1.7 < |F_{G1}/fw| < 2.5 \qquad (2),\text{ where}$$

$F_{G1}$: focal length of the first lens group.

Further, it is desirable that the following formula (3) is satisfied:

$$1.4 < F_{G2}/fw < 2.3 \qquad (3),\text{ where}$$

$F_{G2}$: focal length of the second lens group.

Further, it is desirable that the following formula (4) is satisfied:

$$2.9 < F_{G4}/fw < 4.0 \qquad (4),\text{ where}$$

$F_{G4}$: focal length of the fourth lens group.

Further, it is desirable that the following formula (5) is satisfied:

$$1.4 \leq bf/fw < 2.2 \qquad (5),\text{ where}$$

bf: back focus.

Further, it is desirable that the following formula (6) is satisfied:

$$-1.0 < \beta 2w < -0.4 \qquad (6),\text{ where}$$

$\beta 2w$: magnification of the second lens group at wide end.

Further, it is desirable that the following formula (7) is satisfied:

$$1.35 < \beta 3w < 1.80 \qquad (7),\text{ where}$$

$\beta 3w$: magnification of the third lens group at wide end.

Further, a projection-type display apparatus of the present invention is a projection-type display apparatus comprising:

a light source;
a light valve;
an illumination optical unit that guides rays of light output from the light source to the light valve; and
a zoom lens for projection according to any aspect of the present invention,
wherein the rays of light output from the light source are optically modulated by the light valve, and projected onto a screen by the zoom lens for projection.

The term "magnification side" means a projected side (screen side). Even in reduction projection, the screen side is referred to as "magnification side" for convenience. Further, the term "reduction side" means an original image display area side (light valve side). Even in reduction projection, the light valve side is referred to as "reduction side" for convenience.

A zoom lens for projection of the present invention is composed of four lens groups of a negative lens group, a positive lens group, a positive lens group, and a positive lens group, which are arranged from the magnification side in the order mentioned above. Further, the zoom lens for projection of the present invention uses a two-group-movable zooming method, and only the second lens group and the third lens group, which are middle lens groups, move during zooming.

Therefore, it is possible to distribute negative refractive power to magnification side and positive refractive power to reduction side, and to increase the telecentricity on the reduction side, while a necessary back focus is maintained.

Further, the zoom lens for projection of the present invention can achieve excellent optical performance as to chromatic aberrations, astigmatic difference or the like without using any aspheric lens in the third lens group. For that purpose, the zoom lens for projection of the present invention satisfies the formula (1), and the refractive power of the third lens group is greatly reduced to minimize the variable magnification function of the third lens group.

When a two-group-movable zoom method is used in a zoom lens for projection, there is an option of distributing strong refractive power to each of the two movable lens groups to obtain a high magnification ratio, while generation of aberrations in total is minimized. However, such an option is actually disadvantageous as to optical performance, because fluctuation of aberration in total becomes large by variable magnification using the refractive power of the third lens group, which is a reduction-side movable lens group.

Therefore, in the zoom lens for projection of the present invention, the refractive power of the third lens group is greatly reduced to satisfy the formula (1), and correction of aberration is assigned, as a main function, to the third lens group. Further, most of variable magnification function is assigned to the second lens group. Therefore, although the zoom lens for projection of the present invention is a compact lens using a minimum number of aspheric lens, an optical performance that would be achievable by using the two-group-movable zoom method is realized in an excellent manner.

As described above, when an aspheric lens made of plastic is arranged on the reduction side of a stop, fluctuation of an image plane and fluctuation of field curvature caused by a change in temperature become large. However, in the zoom lens for projection of the present invention, it is not necessary to arrange an aspheric lens on the reduction side of the stop. Therefore, it is possible to reduce the bad influence on aberration caused by the change in temperature.

BRIEF DESCRIPTION OF THE DRAWINGS

FIG. 7A-*ii* is a diagram illustrating astigmatism of the zoom lens for projection in Example 1 at wide end;

FIG. 7A-*iii* is a diagram illustrating distortion of the zoom lens for projection in Example 1 at wide end;

FIG. 7A-*iv* is a diagram illustrating lateral chromatic aberration of the zoom lens for projection in Example 1 at wide end;

FIG. 7B-*i* is a diagram illustrating spherical aberration of the zoom lens for projection in Example 1 at middle position;

FIG. 7B-*ii* is a diagram illustrating astigmatism of the zoom lens for projection in Example 1 at middle position;

FIG. 7B-*iii* is a diagram illustrating distortion of the zoom lens for projection in Example 1 at middle position;

FIG. 7B-*iv* is a diagram illustrating lateral chromatic aberration of the zoom lens for projection in Example 1 at middle position;

FIG. 7C-*i* is a diagram illustrating spherical aberration of the zoom lens for projection in Example 1 at tele end;

FIG. 7C-*ii* is a diagram illustrating astigmatism of the zoom lens for projection in Example 1 at tele end;

FIG. 7C-*iii* is a diagram illustrating distortion of the zoom lens for projection in Example 1 at tele end;

FIG. 7C-*iv* is a diagram illustrating lateral chromatic aberration of the zoom lens for projection in Example 1 at tele end;

FIG. 8A-*ii* is a diagram illustrating astigmatism of the zoom lens for projection in Example 2 at wide end;

FIG. 8A-*iii* is a diagram illustrating distortion of the zoom lens for projection in Example 2 at wide end;

FIG. 8A-*iv* is a diagram illustrating lateral chromatic aberration of the zoom lens for projection in Example 2 at wide end;

FIG. 8B-*i* is a diagram illustrating spherical aberration of the zoom lens for projection in Example 2 at middle position;

FIG. 8B-*ii* is a diagram illustrating astigmatism of the zoom lens for projection in Example 2 at middle position;

FIG. 8B-*iii* is a diagram illustrating distortion of the zoom lens for projection in Example 2 at middle position;

FIG. 8B-*iv* is a diagram illustrating lateral chromatic aberration of the zoom lens for projection in Example 2 at middle position;

FIG. 8C-*i* is a diagram illustrating spherical aberration of the zoom lens for projection in Example 2 at tele end;

FIG. 8C-*ii* is a diagram illustrating astigmatism of the zoom lens for projection in Example 2 at tele end;

FIG. 8C-*iii* is a diagram illustrating distortion of the zoom lens for projection in Example 2 at tele end;

FIG. 8C-*iv* is a diagram illustrating lateral chromatic aberration of the zoom lens for projection in Example 2 at tele end;

FIG. 9A-*ii* is a diagram illustrating astigmatism of the zoom lens for projection in Example 3 at wide end;

FIG. 9A-*iii* is a diagram illustrating distortion of the zoom lens for projection in Example 3 at wide end;

FIG. 9A-*iv* is a diagram illustrating lateral chromatic aberration of the zoom lens for projection in Example 3 at wide end;

FIG. 9B-*i* is a diagram illustrating spherical aberration of the zoom lens for projection in Example 3 at middle position;

FIG. 9B-*ii* is a diagram illustrating astigmatism of the zoom lens for projection in Example 3 at middle position;

FIG. 9B-*iii* is a diagram illustrating distortion of the zoom lens for projection in Example 3 at middle position;

FIG. 9B-*iv* is a diagram illustrating lateral chromatic aberration of the zoom lens for projection in Example 3 at middle position;

FIG. 9C-*i* is a diagram illustrating spherical aberration of the zoom lens for projection in Example 3 at tele end;

FIG. 9C-*ii* is a diagram illustrating astigmatism of the zoom lens for projection in Example 3 at tele end;

FIG. 9C-*iii* is a diagram illustrating distortion of the zoom lens for projection in Example 3 at tele end;

FIG. 9C-*iv* is a diagram illustrating lateral chromatic aberration of the zoom lens for projection in Example 3 at tele end; and FIG. 10 is a schematic diagram illustrating the configuration of a projection-type display apparatus according to an embodiment of the present invention.

DESCRIPTION OF THE PREFERRED EMBODIMENTS

Figure 1:
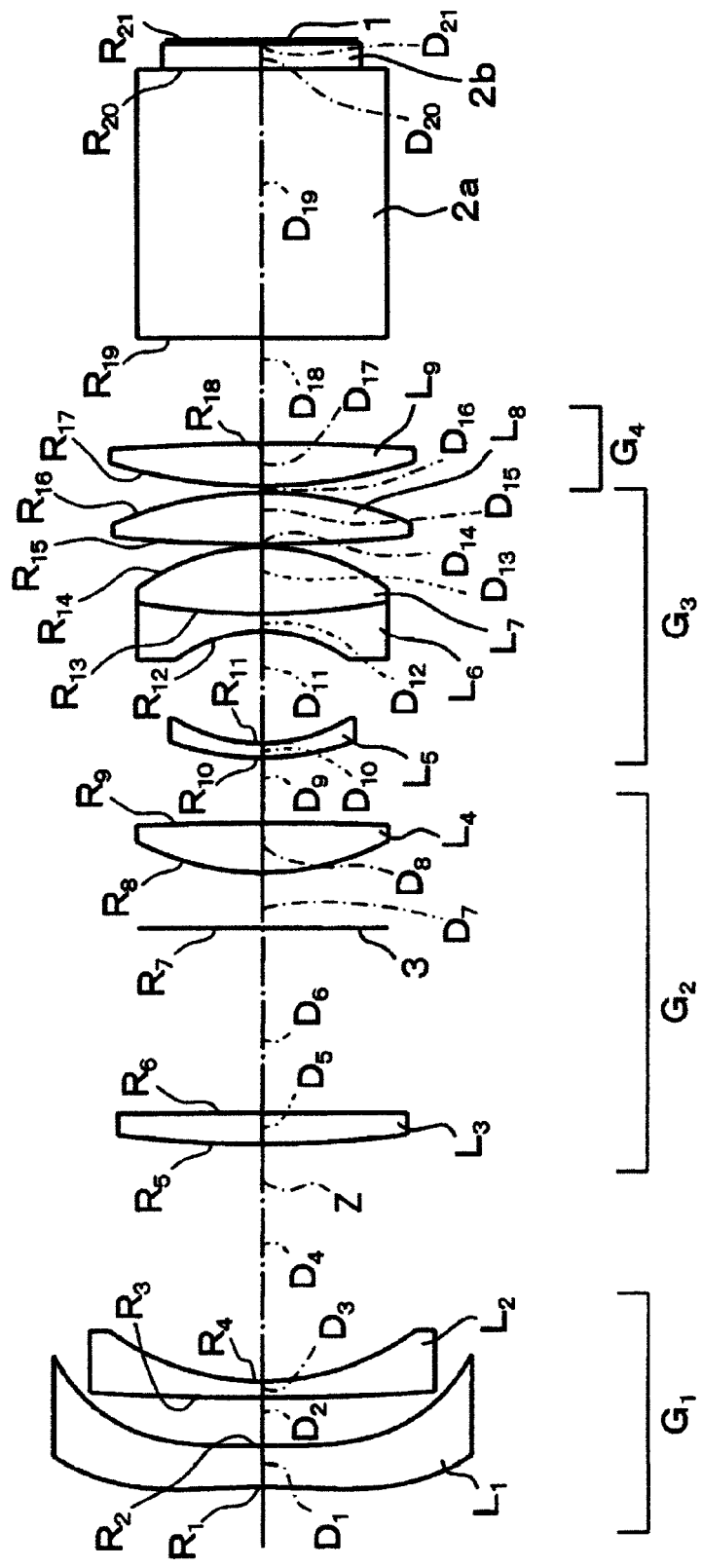
FIG. 1 is a detailed diagram illustrating the structure of a zoom lens for projection in Example 1.

Hereinafter, embodiments of the present invention will be described with reference to drawings. FIG. 1 is a diagram illustrating a zoom lens for projection according to an embodiment of the present invention (Example 1 is used as an example). In the zoom lens for projection illustrated in FIG. 1, first lens group $G_1$ having negative refractive power, second lens group $G_2$ having positive refractive power, third lens group $G_3$ having positive refractive power, and fourth lens group $G_4$ having positive refractive power are arranged from the magnification side of the zoom lens in the order mentioned above. Further, a glass block (including a filter unit) 2, which is mainly a color combination prism, and an image display plane 1 of a light valve, such as a liquid crystal display panel, are arranged at a later stage after the zoom lens. In FIG. 1, line Z represents an optical axis. Further, the reduction side of the zoom lens for projection is telecentric or weakly telecentric to make the color properties of the color combination prism excellent, and to make the contrast of the light valve uniform through the entire screen.

Further, the first lens group $G_1$ and the fourth lens group $G_4$ are fixed during zooming. However, the second lens group $G_2$ (an aperture stop (a mask may be used) 3 may be integrated) and the third lens group $G_3$ move on the optical axis Z of the zoom lens toward the magnification side, based on an operation for operating the zoom lens from wide end to tele end, in such a manner that a distance between the second lens group $G_2$ and the third lens group $G_3$ changes.

During focusing, it is desirable that the whole first lens group $G_1$ moves along the optical axis Z as one group. Alternatively, focusing may be performed by moving all or a part of other lens groups.

Further, it is desirable that the first lens group $G_1$ is composed of negative first lens $L_1$, which is an aspheric lens made of plastic, and negative second lens $L_2$, which are arranged from the magnification side in the order mentioned above.

Further, it is desirable that the second lens group $G_2$ is composed of two positive lenses. Consequently, it is possible to make the lens system compact and to reduce the cost of the lens system. Further, it is more desirable that the second lens group $G_2$ is composed of third lens $L_3$, which is a double convex lens, a stop (a mask may be used; hereinafter, the same) 3, and fourth lens $L_4$, which is a double convex lens. When the stop (mask) 3 is arranged between the two positive lenses, it is possible to make the telecentricity on the reduction side more excellent.

Further, it is desirable that the third lens group $G_3$ is composed of fifth lens $L_5$, which is a negative meniscus lens having a convex surface facing the magnification side, negative sixth lens $L_6$ having a concave surface facing the magnification side, positive seventh lens $L_7$ having a convex surface facing the reduction side of the zoom lens, and positive eighth lens $L_8$. The fifth through eighth lenses are arranged from the magnification side in the order mentioned above. Further, it is desirable that the negative sixth lens $L_6$ and the positive seventh lens $L_7$ are cemented together to form a cemented lens.

Further, it is desirable that the fourth lens group $G_4$ is composed of positive ninth lens $L_9$.

As described above, the zoom lens for projection according to an embodiment of the present invention is a negative-lead-type zoom lens. Therefore, it is possible to easily increase the projection angle, and to maintain an appropriate length of back focus.

Further, the zoom lens for projection according to the embodiment of the present invention satisfies the following formula (1):

$$17 < F_{G3}/fw \qquad (1),\text{ where}$$

$F_{G3}$: focal length of the third lens group $G_3$, and
fw: focal length of the entire system of the zoom lens at wide end.

As described above, in the zoom lens for projection according to the embodiment of the present invention, the refractive power of the third lens group $G_3$ is greatly reduced to satisfy the formula (1), and correction of aberration is assigned, as a main function, to the third lens group $G_3$. Further, most of variable magnification function is assigned to the second lens group $G_2$. Therefore, an optical performance that would be achievable by using the two-group-movable zoom method is realized in an excellent manner.

Specifically, when the value of $F_{G3}/fw$ is lower than the lower limit defined by the formula (1), the refractive power of the third lens group $G_3$ becomes too strong, and it becomes difficult to obtain excellent optical performance.

Therefore, it is desirable that the following formula (1') is satisfied instead of the formula (1):

$$20 < F_{G3}/fw \qquad (1').$$

Further, it is more desirable that the following formula (1'') is satisfied instead of the formula (1):

$$25 < F_{G3}/fw \qquad (1'').$$

In the zoom lens for projection according to the embodiment of the present invention, the power of each lens group is arranged as described above, and the diameter of rays of light on the reduction side is larger than that of rays of light on the magnification side. Further, the reduction side is telecentric. Therefore, the outer diameter of at least one lens in the third lens group $G_3$ and the fourth lens group $G_4$, which are lens groups on the reduction side, becomes large. In this circumstance, the third lens group $G_3$ is composed of four lenses to maintain an optical performance that can cope with the movement of the third lens group $G_3$ during zooming, and to obtain a fast zoom lens with the F-number of approximately 1.7.

As described above, it is desirable that the first lens group $G_1$ functions as a focusing unit. When the first lens group $G_1$ is composed of two lenses, it is possible to easily drive the first lens group $G_1$ during focusing.

Further, it is desirable that one of the two negative lenses in the first lens group $G_1$ is an aspheric lens. Further, it is more desirable that the first lens $L_1$ on the magnification side is an aspheric lens to enhance aberration correction function of the first lens group $G_1$. In this case, it is cost-advantageous that the aspheric lens is made of plastic. When the aspheric lens is made of plastic, it is essential to make the refractive power of the aspheric lens as low as possible to reduce the influence of a change in temperature on the aspheric lens. Therefore, since most of the refractive power of the first lens group $G_1$ is provided by the second lens $L_2$, it is desirable that the refractive power of the first lens group $G_1$, as a whole, satisfies the following formula (2) to prevent a great increase in various aberrations:

$$1.7 < |F_{G1}/fw| < 2.5 \qquad (2),\text{ where}$$

$F_{G1}$: focal length of the first lens group $G_1$ and
fw: focal length of the entire system of the zoom lens at wide end.

When the value of $|F_{G1}/fw|$ exceeds the upper limit defined by the formula (2), the distance of movement of the first lens group $G_1$ during focusing becomes too long, and the diameter of a front lens increases. In contrast, when the value of $|F_{G1}/fw|$ is lower than the lower limit defined by the formula (2), correction of various aberration, especially, correction related to an image plane becomes difficult.

Therefore, it is desirable that the following formula (2') is satisfied instead of the formula (2):

$$1.8 < |F_{G1}/fw| < 2.3 \qquad (2').$$

Further, it is more desirable that the following formula (2'') is satisfied instead of the formula (2):

$$1.9 < |F_{G1}/fw| < 2.2 \qquad (2'').$$

Further, it is desirable that the second lens group $G_2$ is composed of positive third lens $L_3$ and positive fourth lens $L_4$, which are arranged from the magnification side in the order mentioned above. As described above, the refractive power of the third lens group $G_3$ of the two movable lens groups in the two-group-movable method is remarkably small. Therefore, the variable magnification function of the movable lens groups is substantially assigned to the second lens group $G_2$. Therefore, although it is necessary that the power of the second lens group $G_2$ is strong to some extent, if the power of the second lens group $G_2$ is too strong, aberrations of the movable lens groups, as a whole, become too large, and it becomes difficult correct the aberrations. Therefore, it is desirable that the following formula (3) is satisfied:

$$1.4 < F_{G2}/fw < 2.3 \qquad (3),\text{ where}$$

$F_{G2}$: focal length of the second lens group $G_2$, and
fw: focal length of entire system at wide end.

Specifically, when the value of $F_{G2}/fw$ exceeds the upper limit defined by the formula (3), the power of the second lens group $G_2$ becomes too weak, and the distance of movement of the second lens group $G_2$ becomes too long. In contrast, when the value of $F_{G2}/fw$ is lower than the lower limit defined by the formula (3), the power of the second lens group $G_2$ becomes too strong, and it becomes difficult to correct aberrations in an excellent manner.

Therefore, it is desirable that the following formula (3') is satisfied instead of the formula (3):

$$1.5 < F_{G2}/fw < 2.2 \qquad (3').$$

Further, it is more desirable that the following formula (3'') is satisfied instead of the formula (3):

$$1.6 < F_{G2}/fw < 2.1 \qquad (3'').$$

Further, it is desirable that the fourth lens group $G_4$ has positive refractive power, and that the fourth lens group $G_4$ can suppress correction of aberration in an excellent range, while the entire lens length is reduced. Therefore, it is desirable that the following formula (4) is satisfied:

$$2.9 < F_{G4}/fw < 4.0 \qquad (4),\text{ where}$$

$F_{G4}$ focal length of fourth lens group $G_4$, and fw: focal length of the entire system of the zoom lens at wide end.

Specifically, when the value of $F_{G4}/fw$ exceeds the upper limit defined by the formula (4), the power of the fourth lens group $G_4$ becomes too weak, and the entire length becomes too long. In contrast, when the value of $F_{G4}/fw$ is lower than the lower limit defined by the formula (4), the power of the fourth lens group $G_4$ becomes too strong, and it becomes difficult to maintain sufficient back focus. Further, it becomes difficult to correct aberration in an excellent manner.

Therefore, it is desirable that the following formula (4') is satisfied instead of the formula (4):

$$3.1 < F_{G4}/fw < 3.8 \tag{4'}$$

Further, it is more desirable that the following formula (4") is satisfied instead of the formula (4):

$$3.3 < F_{G4}/fw < 3.6 \tag{4''}$$

Further, it is desirable that at least one of the following formulas (5) through (8) is satisfied:

$$1.4 \leq bf/fw < 2.2 \tag{5}$$

$$-1.0 < \beta 2w < -0.4 \tag{6}$$

$$1.35 < \beta 3w < 1.80 \tag{7}$$

$$0.99 < Z_{R3} < 1.00 \tag{8}$$

where bf: back focus,
fw: focal length of entire system at wide end,
$\beta 2w$: magnification of the second lens group $G_2$ at wide end,
$\beta 3w$: magnification of the third lens group $G_3$ at wide end, and
$Z_{R3}$: value obtained by dividing magnification of the third lens group $G_3$ at tele end by magnification of the third lens group $G_3$ at wide end.

With respect to the values of $\beta 2w$ and $\beta 3w$, the definition of magnification ($\beta nw$) of a generalized n-th lens group $G_n$ at wide end will be described. Specifically, when rays of light enter the zoom lens for projection from the magnification side, if the height of an image formed by a lens group or groups (if n is 3, the first lens group $G_1$ and the second lens group $G_2$) on the magnification side of the n-th lens group $G_n$ is image height 1 at wide end, and the height of an image formed by the n-th lens group $G_n$ using, as an object, the image that has been formed by the lens group or groups is image height 2, the ratio (image height ratio) of the image height 2 to the image height 1 is defined as magnification ($\beta nw$) of the n-th lens group $G_n$ at wide end.

The formula (5) defines the back focus of the zoom lens for projection. When the value of bf/fw is lower than the lower limit defined by the formula (5), it becomes difficult to insert an optical system, such as a color combination prism, between a lens and a light valve. In contrast, when the value of bf/fw exceeds the upper limit defined by the formula (5), the entire lens length becomes too long, and aberration at wide end is not corrected in an excellent manner.

Therefore, it is desirable that the following formula (5') is satisfied instead of the formula (5):

$$1.5 < bf/fw < 1.9 \tag{5'}$$

Further, it is more desirable that the following formula (5") is satisfied instead of the formula (5):

$$1.6 < bf/fw < 1.7 \tag{5''}$$

The formula (6) defines the magnification of the second lens group $G_2$ at wide end. When the value of $\beta 2w$ is lower than the lower limit defined by the formula (6), the power of the second lens group $G_2$ becomes too strong, and it becomes difficult to correct aberration in an excellent manner. In contrast, when the value of $\beta 2w$ exceeds the upper limit defined by the formula (6), the power of the second lens group $G_2$ becomes too weak, and the distance of movement of the second lens group $G_2$ becomes too long.

Therefore, it is desirable that the following formula (6') is satisfied instead of the formula (6):

$$-0.9 < \beta 2w < -0.5 \tag{6'}$$

Further, it is more desirable that the following formula (6") is satisfied instead of the formula (6):

$$-0.75 < \beta 2w < -0.60 \tag{6''}$$

Meanwhile, the formula (7) defines the magnification of the third lens group $G_3$ at wide end. When the value of $\beta 3w$ exceeds the upper limit defined by the formula (7), the power of the third lens group $G_3$ becomes too strong, and it becomes difficult to correct aberration in an excellent manner. In contrast, when the value of $\beta 3w$ is lower than the lower limit defined by the formula (7), the power of the third lens group $G_3$ becomes too weak, and the distance of movement of the third lens group $G_3$ becomes too long.

Therefore, it is desirable that the following formula (7') is satisfied instead of the formula (7):

$$1.40 < \beta 3w < 1.75 \tag{7'}$$

Further, it is more desirable that the following formula (7") is satisfied instead of the formula (7):

$$1.45 < \beta 3w < 1.70 \tag{7''}$$

Further, the formula (8) defines the range of value $Z_{R3}$ obtained by dividing magnification of the third lens group $G_3$ at tele end by magnification $\beta 3w$ of the third lens group $G_3$ at wide end. Specifically, it is desirable that no aspheric lens is included in the third lens group $G_3$, and it is necessary that the refractive power of each of the positive lens or lenses and the negative lens or lenses constituting the third lens group $G_3$ is strong to reduce chromatic aberrations and astigmatic difference. Therefore, the refractive power of the third lens group $G_3$ as a whole is reduced, and the value of $Z_{R3}$, which represents the ratio of magnifications, is set in a range around 1.0 (minimum range) to minimize the influence of each aberration.

When the value of $Z_{R3}$ exceeds the upper limit defined by the formula (8), or the value of $Z_{R3}$ is lower than the lower limit defined by the formula (8), the fluctuation of aberration is large in either case, and it becomes difficult to correct aberration.

In each example of the zoom lens for projection of the present invention, which will be described later, the first lens group $G_1$ includes at least one aspheric surface. That is advantageous to correction of aberration, such as distortion. The shape of an aspheric surface is represented by the following aspheric surface equation:

$$Z = \frac{Y^2/R}{1+\sqrt{1-K \times Y^2/R^2}} + \sum_{i=3}^{10} A_i Y^i, \qquad \text{[Equation 1]}$$

where

Z: length of a perpendicular from a point on an aspheric surface, the point away from optical axis by distance Y, to a flat plane (flat plane perpendicular to the optical axis) in contact with the vertex of the aspheric surface, Y: distance from the optical axis, R: curvature radius of the aspheric surface in the vicinity of the optical axis, K: eccentricity, and $A_i$: aspheric coefficient (i=3 through 10).

Next, with reference to FIG. 10, an example of a projection-type display apparatus on which the aforementioned zoom lens for projection is mounted will be described. A projection-type display apparatus 30 illustrated in FIG. 10 includes transmissive liquid crystal panels 11a through 11c, as light valves. Further, the zoom lens for projection according to the aforementioned embodiment of the present invention is used as the zoom lens 10 for projection. Further, an integrator (not illustrated), such as an fly eye integrator, is arranged between a light source 15 and a dichroic mirror 12. White light output from the light source 15 enters, through an illumination optical unit, liquid crystal panels 11a through 11c corresponding to rays of light of three colors (G light, B light, and R light), respectively, and is optically modulated. The color of the modulated light is combined by a cross-dichroic prism 14, and the combined light is projected onto a screen, which is not illustrated, by the zoom lens 10 for projection. The projection-type display apparatus 30 includes dichroic mirrors 12, 13 for separating colors, a cross-dichroic prism 14 for combining colors, condenser lenses 16a through 16c, and total reflection mirrors 18a through 18c. Since the projection-type display apparatus 30 of the present embodiment includes the zoom lens for projection according to the embodiment of the present invention, it is possible to reduce the size, the weight and the cost of the apparatus, while structuring the apparatus in such a manner that high variable magnification rate is realizable. Further, it is possible to maintain excellent optical performance.

Use of the zoom lens for projection of the present invention is not limited to the use in a projection-type display apparatus using transmissive liquid crystal display panels or the like. The zoom lens for projection of the present invention may be used as a zoom lens for projection in an apparatus using a refractive liquid crystal display panel or the like, or a different optical modulation means, such as a DMD.

EXAMPLES

Next, the zoom lens for projection of the present invention will be further described using specific examples.

In the following examples, the numerical values of data are normalized by assuming that the focal length fw of entire system at wide end is 1.

Example 1

Figure 2:
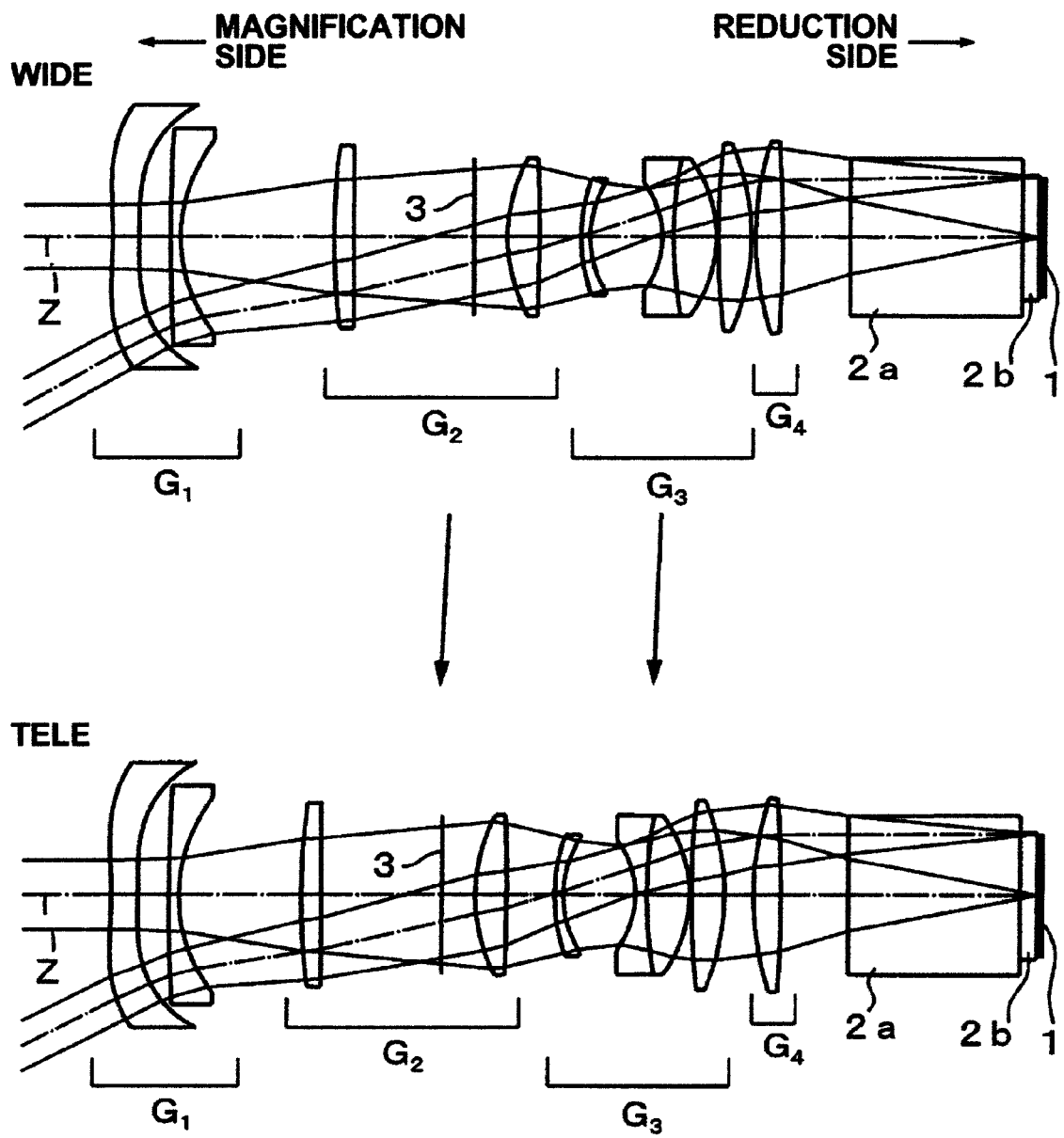
FIG. 2 is a diagram illustrating the paths of incident rays entering the zoom lens for projection in Example 1.

As described already, a zoom lens for projection in Example 1 is structured as illustrated in FIG. 1. Further, the path of movement of each movable lens group during zooming is illustrated in FIG. 2.

Specifically, in the zoom lens for projection of Example 1, lens groups and lenses are arranged from the magnification side of the zoom lens for projection in the order mentioned below. First lens group $G_1$ is composed of first lens $L_1$ and second lens $L_2$. Both surfaces of the first lens $L_1$ are aspheric, and the first lens $L_1$ has negative meniscus shape having a concave surface facing the magnification side of the zoom lens for projection in the vicinity of optical axis Z. The second lens $L_2$ is a negative meniscus lens having a concave surface facing the reduction side of the zoom lens for projection in the vicinity of the optical axis Z. Further, the second lens group $G_2$ is composed of third lens $L_3$, a mask 3, and fourth lens $L_4$. The third lens $L_3$ is a positive meniscus lens having a convex surface facing the magnification side, and the fourth lens $L_4$ is a double convex lens. The third lens group $G_3$ is composed of fifth lens $L_5$, sixth lens $L_6$, seventh lens $L_7$ and eighth lens $L_8$. The fifth lens $L_5$ is a negative meniscus lens having a convex surface facing the magnification side, and the sixth lens $L_6$ is a double concave lens. Further, the seventh lens $L_7$ is a double convex lens, and the eighth lens $L_8$ is a double convex lens. The sixth lens $L_6$ and the seventh lens $L_7$ are cemented together to form a cemented lens. The fourth lens group $G_4$ consists of ninth lens $L_9$, which is a double convex lens.

When magnification is changed, the second lens group $G_2$ and the third lens group $G_3$ move along the optical axis Z toward the magnification side, based on an operation for operating the zoom lens from wide end to tele end, in such a manner that a distance between the second lens group $G_2$ and the third lens group $G_3$ changes.

Focusing is performed by moving the first lens group $G_1$ along the optical axis Z.

The upper section of Table 1 shows curvature radius R (normalized by assuming that the focal length of entire lens system at wide end is 1.0, same in the other tables) of each lens surface, center thickness D of each lens and air space D between lenses (normalized in a manner similar to the curvature radius R, same in the other tables), effective diameter, and refractive index $N_d$ and Abbe number $\nu_d$ of each lens for d-line in Example 1. In Table 1, and in Tables 2 and 2, which will be described later, surface numbers corresponding to signs R and D, effective diameter, and signs $N_d$ and $\nu_d$ sequentially increase from the magnification side. Further, focal length f, angle 2ω of view, and F-number Fno. are shown at the top of Table 1 (same in the other tables).

The middle section of Table 1 shows constants K and $A_3$ through $A_{10}$, which are aspheric coefficients corresponding to aspheric surfaces. Further, the lower section of Table 1 shows variable distance 1, variable distance 2 and variable distance 3 at wide end (wide), at middle position (middle), and at tele end (tele) when projection distance is 162.47. The variable distance 1 is a distance between the first lens group $G_1$ and the second lens group $G_2$. The variable distance 2 is a distance between the second lens group $G_2$ and the third lens group $G_3$. The variable distance 3 is a distance between the third lens group $G_3$ and the fourth lens group $G_4$.

TABLE 1

FOCAL LENGTH: 0.9956-1.0952, PROJECTION DISTANCE: 162.47,
ANGLE OF VIEW: 57.9-53.4 DEGREE, F-NUMBER: F1.70-1.78

| SURFACE NUMBER | R | D | EFFECTIVE DIAMETER | $N_d$ | $\nu_d$ |
|---|---|---|---|---|---|
| 1* | −3.525 | 0.2321 | 2.36 | 1.491000 | 57.5 |
| 2* | −192.489 | 0.2732 | 1.98 | | |
| 3 | 14.109 | 0.0928 | 1.94 | 1.516330 | 64.1 |
| 4 | 1.407 | **(VARIABLE 1) | 1.72 | | |

TABLE 1-continued

| | | | | | |
|---|---|---|---|---|---|
| 5 | 6.154 | 0.1749 | 1.51 | 1.805180 | 25.4 |
| 6 | 471.932 | 1.0556 | 1.48 | | |
| 7 | ∞ | 0.3095 | 1.34 | | |
| 8 | 1.507 | 0.2789 | 1.29 | 1.638540 | 55.4 |
| 9 | −21.173 | **(VARIABLE 2) | 1.27 | | |
| 10 | 1.580 | 0.0770 | 1.07 | 1.516330 | 64.1 |
| 11 | 0.926 | 0.6387 | 1.00 | | |
| 12 | −0.820 | 0.1006 | 0.98 | 1.805180 | 25.4 |
| 13 | 3.855 | 0.3790 | 1.18 | 1.603110 | 60.6 |
| 14 | −1.178 | 0.0155 | 1.29 | | |
| 15 | 7.639 | 0.2926 | 1.49 | 1.670030 | 47.3 |
| 16 | −2.125 | **(VARIABLE 3) | 1.54 | | |
| 17 | 2.807 | 0.2406 | 1.60 | 1.670030 | 47.3 |
| 18 | −11.988 | 0.5957 | 1.59 | | |
| 19 | ∞ | 1.5241 | | 1.516330 | 64.1 |
| 20 | ∞ | 0.1470 | | 1.458460 | 67.9 |
| 21 | ∞ | 0.0018 | | | |

*ASPHERIC SURFACE
*ASPHERIC COEFFICIENT

| SURFACE NUMBER | K | $A_3$ | $A_4$ | $A_5$ | $A_6$ |
|---|---|---|---|---|---|
| FIRST SURFACE | 1.000000 | 1.082237E−01 | 1.758484E−01 | 2.101824E−03 | −6.714115E−02 |
| | | $A_7$ | $A_8$ | $A_9$ | $A_{10}$ |
| | | −3.023992E−02 | 2.847831E−02 | 1.791367E−02 | −9.394978E−03 |
| SURFACE NUMBER | K | $A_3$ | $A_4$ | $A_5$ | $A_6$ |
| SECOND SURFACE | 1.000000 | 1.185776E−01 | 1.447293E−01 | 5.545868E−02 | −2.244391E−02 |
| | | $A_7$ | $A_8$ | $A_9$ | $A_{10}$ |
| | | −2.763185E−02 | −2.720823E−02 | −8.329509E−03 | 3.995375E−02 |

**VARIABLE DISTANCE

| | WIDE | MIDDLE | TELE |
|---|---|---|---|
| $D_4$ (VARIABLE 1) | 1.3528 | 1.2129 | 1.0820 |
| $D_9$ (VARIABLE 2) | 0.3729 | 0.3926 | 0.4242 |
| $D_{16}$ (VARIABLE 3) | 0.0386 | 0.1588 | 0.2581 |

Table 4 shows numerical values corresponding to formulas (1) through (8) in Example 1.

FIGS. 7A-i, 7A-ii, 7A-iii, and 7A-iv are diagram illustrating spherical aberration, astigmatism, distortion and lateral chromatic aberration of the zoom lens for projection in Example 1 at wide end (wide). FIGS. 7B-i, 7B-ii, 7B-iii, and 7B-iv are diagram illustrating spherical aberration, astigmatism, distortion and lateral chromatic aberration of the zoom lens for projection in Example 1 at middle position (middle). FIGS. 7C-i, 7C-ii, 7C-iii, and 7C-iv are diagram illustrating spherical aberration, astigmatism, distortion and lateral chromatic aberration of the zoom lens for projection in Example 1 at tele end (tele). In FIGS. 7A-i through 7C-iv, and in FIGS. 8A-i through 8C-iv and FIGS. 9A-i through 9C-iv, which will be described later, diagrams of spherical aberrations illustrate aberrations for light at each wavelength of G (green), B (blue) and R (red). Further, diagrams of astigmatism illustrate aberrations with respect to sagittal image planes and tangential image planes. Further, diagrams of lateral chromatic aberrations illustrate aberrations of B light and R light with respect to G light.

As Table 1 shows, the angle 2ω of view of the zoom lens for projection in Example 1 at wide end is 57.9 degrees, which is wide, and the F-number of the zoom lens for projection in Example 1 is 1.70, which is small (fast lens). Further, as FIGS. 7A-i through 7C-iv clearly illustrate, each aberration is corrected in an excellent manner.

Further, as Table 4 shows, the zoom lens for projection in Example 1 satisfies all of formulas (1) through (8), and formulas (1') through (7'), and formulas (1") through (4"), (6") and (7").

Example 2

Figure 3:
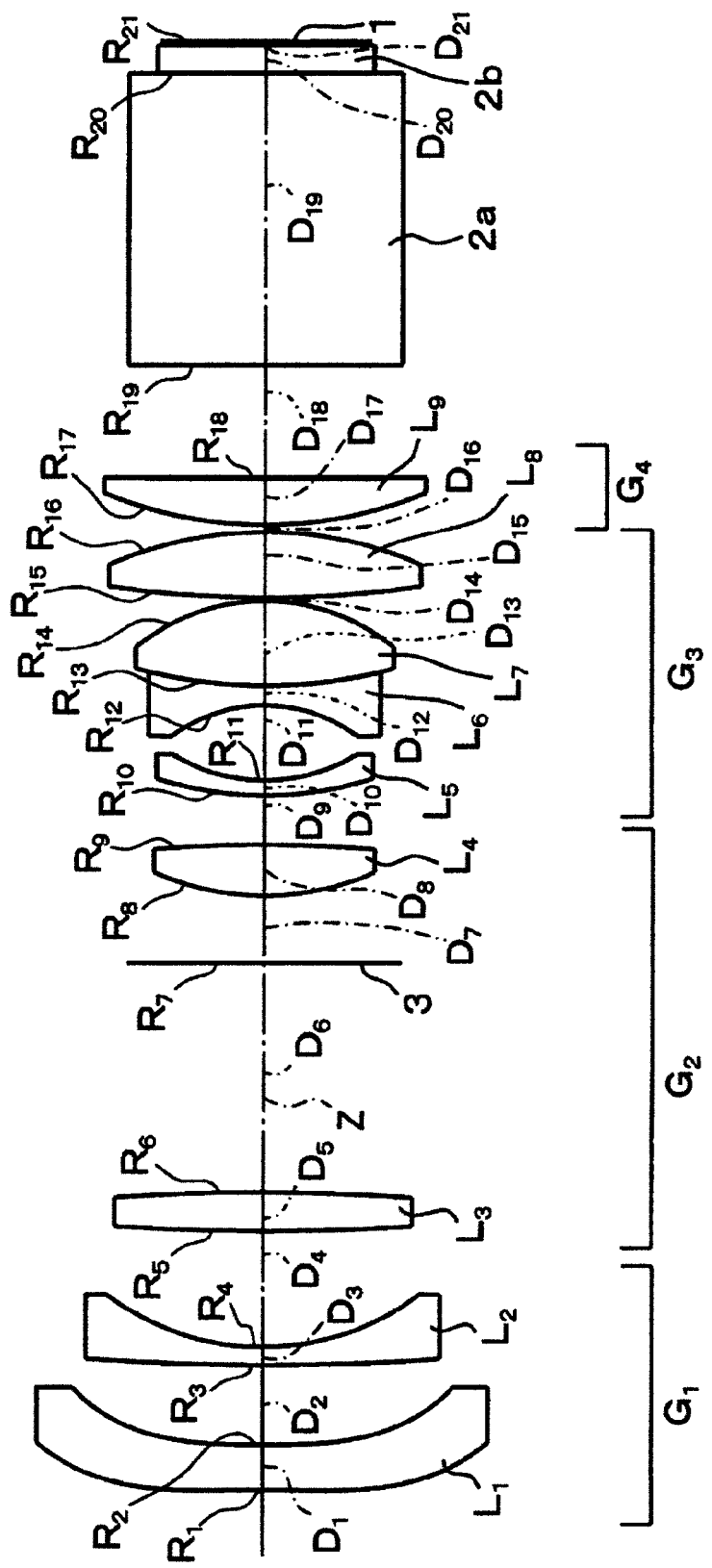
FIG. 3 is a detailed diagram illustrating the structure of a zoom lens for projection in Example 2.
Figure 4:
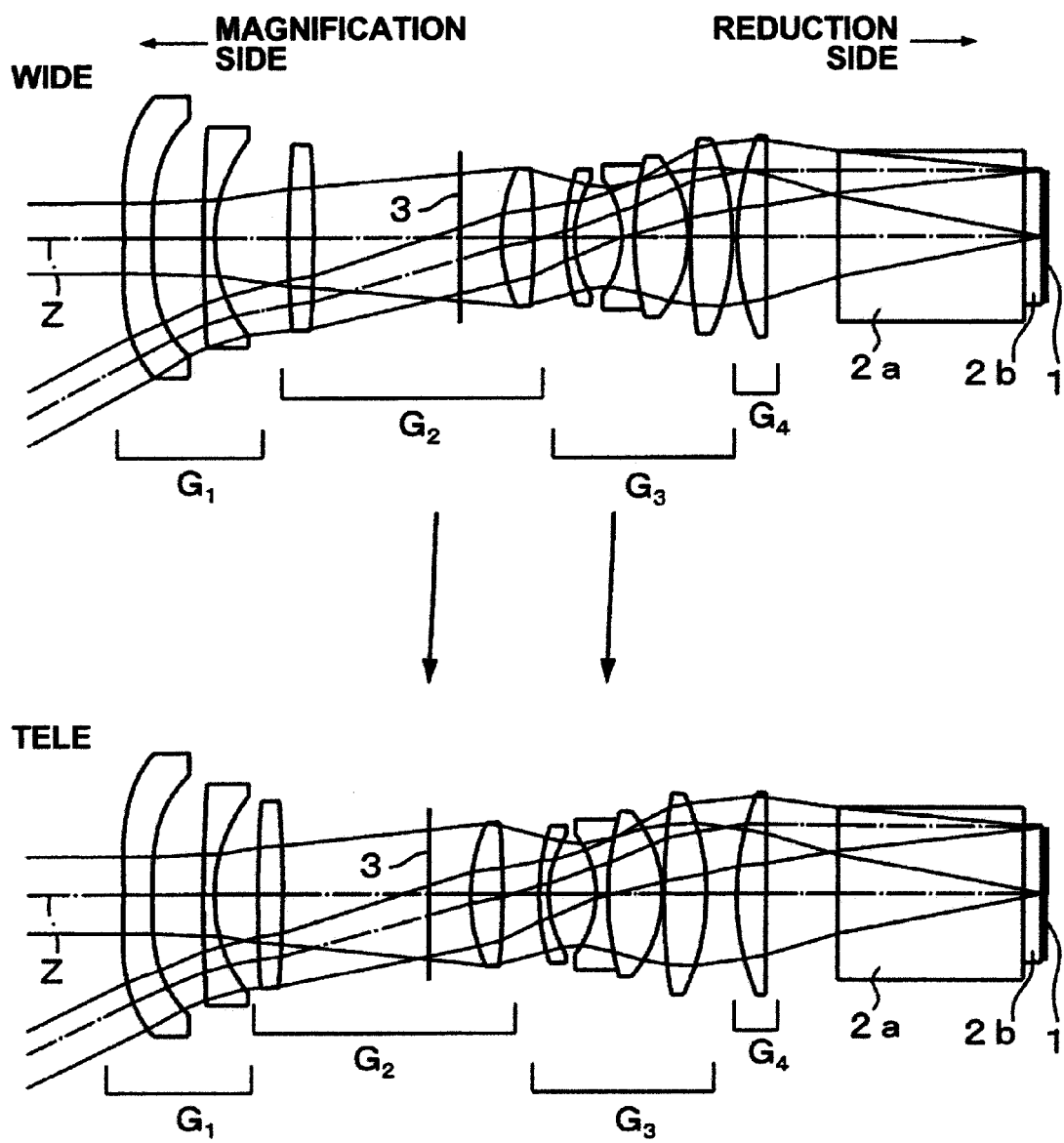
FIG. 4 is a diagram illustrating the paths of incident rays entering the zoom lens for projection in Example 2.

A zoom lens for projection in Example 2 is structured as illustrated in FIG. 3. Further, the path of movement of each movable lens group during zooming is illustrated in FIG. 4.

The zoom lens for projection in Example 2 is structured in a substantially similar manner to the zoom lens for projection in Example 1. However, the zoom lens for projection in Example 2 mainly differs from the zoom lens for projection in Example 1 in that both surfaces of the first lens $L_1$ are aspheric as in Example 1 but the first lens $L_1$ in Example 2 has double concave shape on optical axis Z, and that the third lens $L_3$ is a double convex lens, and that the ninth lens $L_9$ is a positive meniscus lens having a convex surface facing the magnification side.

The upper section of Table 2 shows curvature radius R of each lens surface, center thickness D of each lens and air space D between lenses, effective diameter, and refractive index $N_d$ and Abbe number $v_d$ of each lens for d-line in Example 2.

The middle section of Table 2 shows constants K and $A_3$ through $A_{10}$, which are aspheric coefficients corresponding to aspheric surfaces. Further, the lower section of Table 2 shows variable distance 1, variable distance 2 and variable distance 3 at wide end (wide), at middle position (middle), and at tele end (tele) when projection distance is 160.43. The variable distance 1 is a distance between the first lens group $G_1$ and the second lens group $G_2$. The variable distance 2 is a distance between the second lens group $G_2$ and the third lens group $G_3$. The variable distance 3 is a distance between the third lens group $G_3$ and the fourth lens group $G_4$.

TABLE 2

FOCAL LENGTH: 0.9952-1.0947, PROJECTION DISTANCE: 160.43,
ANGLE OF VIEW: 56.9-52.5 DEGREE, F-NUMBER: F1.70-1.75

| SURFACE NUMBER | R | D | EFFECTIVE DIAMETER | $N_d$ | $\nu_d$ |
|---|---|---|---|---|---|
| 1* | −8.093 | 0.2292 | 2.30 | 1.491000 | 57.5 |
| 2* | 7.650 | 0.4103 | 1.94 | | |
| 3 | 12.751 | 0.0917 | 1.80 | 1.516330 | 64.1 |
| 4 | 1.299 | **(VARIABLE 1) | 1.58 | | |
| 5 | 10.481 | 0.2026 | 1.51 | 1.846660 | 23.8 |
| 6 | −10.717 | 1.1758 | 1.48 | | |
| 7 | ∞ | 0.3438 | 1.04 | | |
| 8 | 1.385 | 0.2606 | 1.16 | 1.670029 | 47.2 |
| 9 | −6.841 | **(VARIABLE 2) | 1.10 | | |
| 10 | 1.841 | 0.0764 | 1.01 | 1.581439 | 40.7 |
| 11 | 0.899 | 0.3833 | 0.96 | | |
| 12 | −0.789 | 0.0993 | 0.97 | 1.800000 | 29.8 |
| 13 | 2.508 | 0.4350 | 1.21 | 1.497000 | 81.5 |
| 14 | −1.028 | 0.0153 | 1.33 | | |
| 15 | 5.507 | 0.3416 | 1.59 | 1.677900 | 55.3 |
| 16 | −1.931 | **(VARIABLE 3) | 1.62 | | |
| 17 | 2.134 | 0.2361 | 1.58 | 1.622992 | 58.2 |
| 18 | 191.057 | 0.5791 | 1.56 | | |
| 19 | ∞ | 1.5050 | | 1.516330 | 64.1 |
| 20 | ∞ | 0.1452 | | 1.458460 | 67.9 |
| 21 | ∞ | 0.0007 | | | |

*ASPHERIC SURFACE
*ASPHERIC COEFFICIENT

| SURFACE NUMBER FIRST SURFACE | K 1.000000 | $A_3$ 5.747111E−02 | $A_4$ 1.570633E−01 | $A_5$ 6.558479E−02 | $A_6$ −8.217131E−02 |
|---|---|---|---|---|---|
| | | $A_7$ −4.970768E−02 | $A_8$ 4.790161E−02 | $A_9$ 5.961544E−03 | $A_{10}$ −3.836974E−03 |
| SURFACE NUMBER SECOND SURFACE | K 1.000000 | $A_3$ 6.877835E−02 | $A_4$ 1.510939E−01 | $A_5$ 6.363136E−02 | $A_6$ 7.095240E−03 |
| | | $A_7$ −1.181551E−02 | $A_8$ −4.111874E−02 | $A_9$ −5.816036E−02 | $A_{10}$ 8.522348E−02 |

**VARIABLE DISTANCE

| | WIDE | MIDDLE | TELE |
|---|---|---|---|
| $D_4$ (VARIABLE 1) | 0.5988 | 0.4712 | 0.3515 |
| $D_9$ (VARIABLE 2) | 0.2550 | 0.2707 | 0.2942 |
| $D_{16}$ (VARIABLE 3) | 0.0381 | 0.1499 | 0.2461 |

Table 4 shows numerical values corresponding to the formulas in Example 2.

FIGS. 8A-i, 8A-ii, 8A-iii, and 8A-iv are diagram illustrating spherical aberration, astigmatism, distortion and lateral chromatic aberration of the zoom lens for projection in Example 2 at wide end (wide). FIGS. 8B-i, 8B-ii, 8B-iii, and 8B-iv are diagram illustrating spherical aberration, astigmatism, distortion and lateral chromatic aberration of the zoom lens for projection in Example 2 at middle position (middle). FIGS. 8C-i, 8C-ii, 8C-ii, and 8C-iv are diagram illustrating spherical aberration, astigmatism, distortion and lateral chromatic aberration of the zoom lens for projection in Example 2 at tele end (tele).

As Table 2 shows, the angle 2ω of view of the zoom lens for projection in Example 2 at wide end is 56.9 degrees, which is wide, and the F-number of the zoom lens for projection in Example 2 is 1.70, which is small (fast lens). Further, as FIGS. 8A-i through 8C-iv clearly illustrate, each aberration is corrected in an excellent manner.

Further, as Table 4 shows, the zoom lens for projection in Example 2 satisfies all of formulas (1) through (8), and formulas (1') through (7'), and formulas (1") through (7").

Example 3

Figure 5:
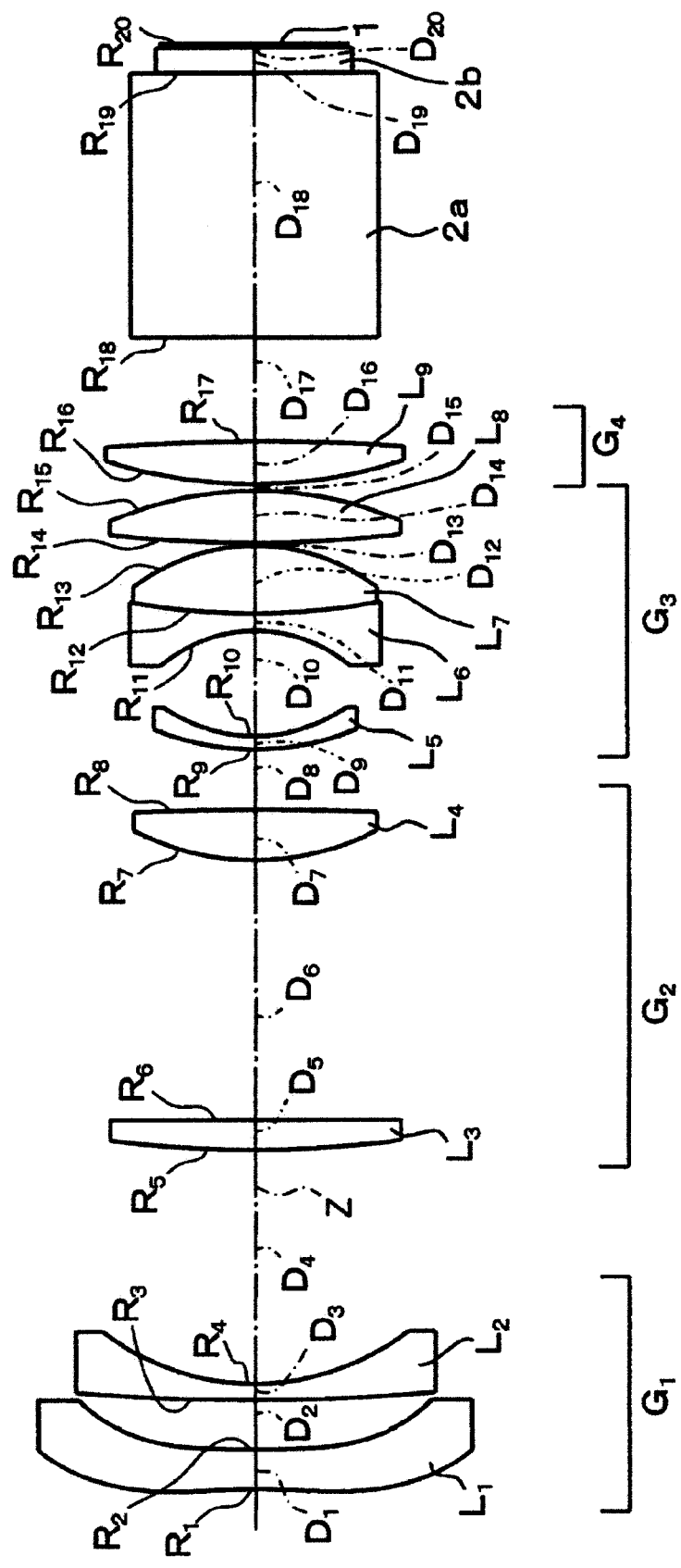
FIG. 5 is a detailed diagram illustrating the structure of a zoom lens for projection in Example 3.
Figure 6:
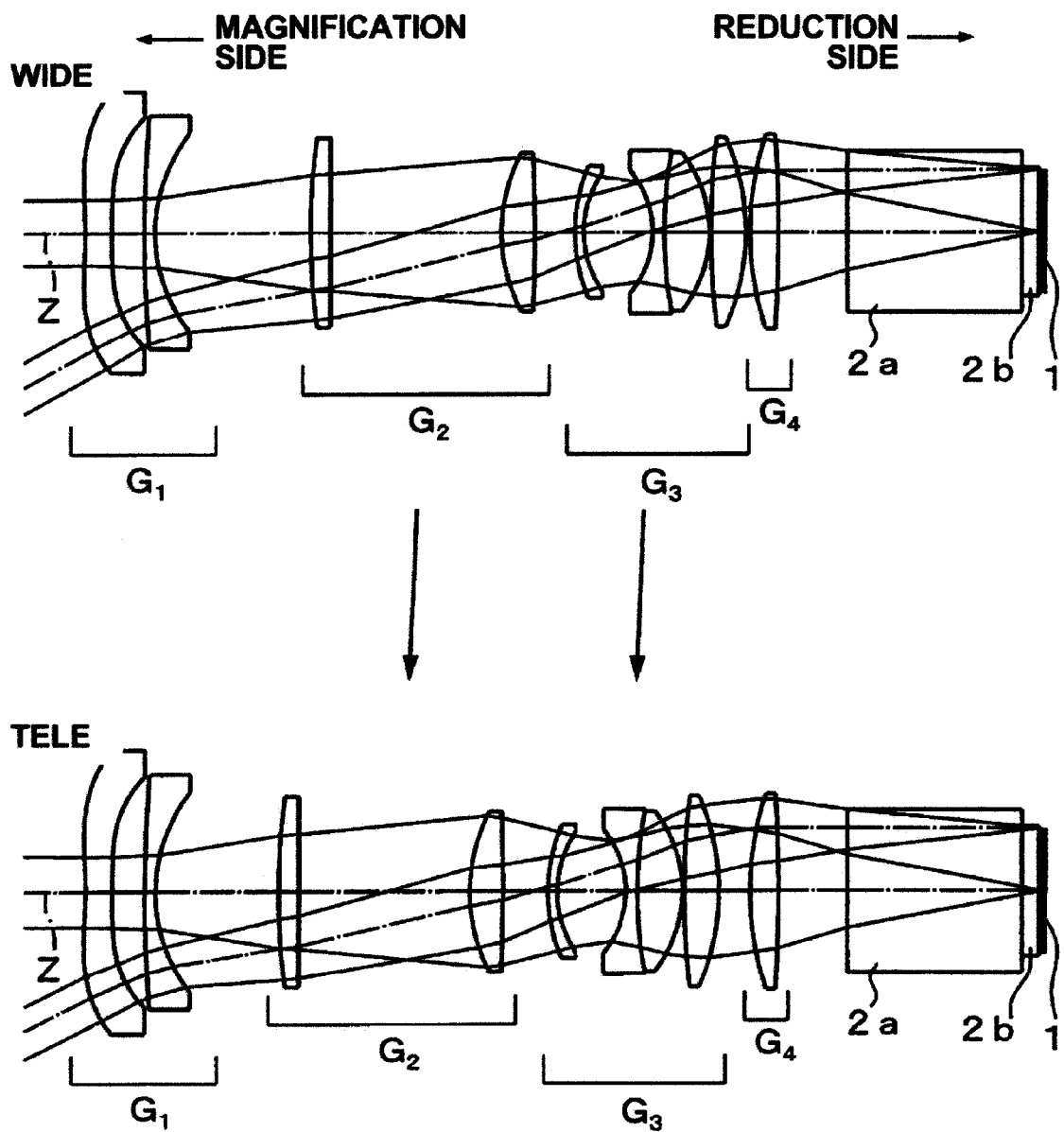
FIG. 6 is a diagram illustrating the paths of incident rays entering the zoom lens for projection in Example 3.
Figure 7:
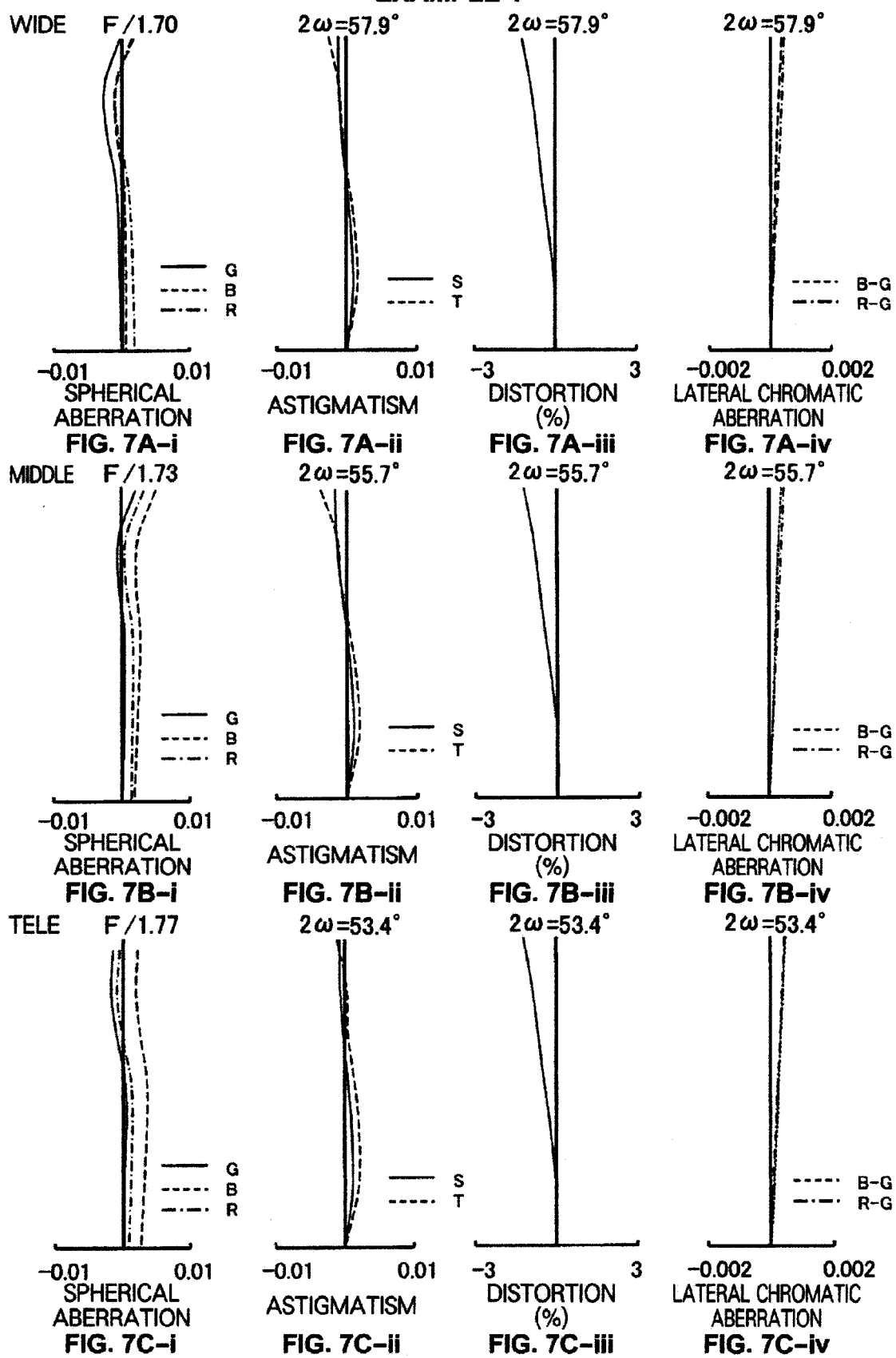
FIG. 7A-*i* is a diagram illustrating spherical aberration of the zoom lens for projection in Example 1 at wide end.
Figure 8:
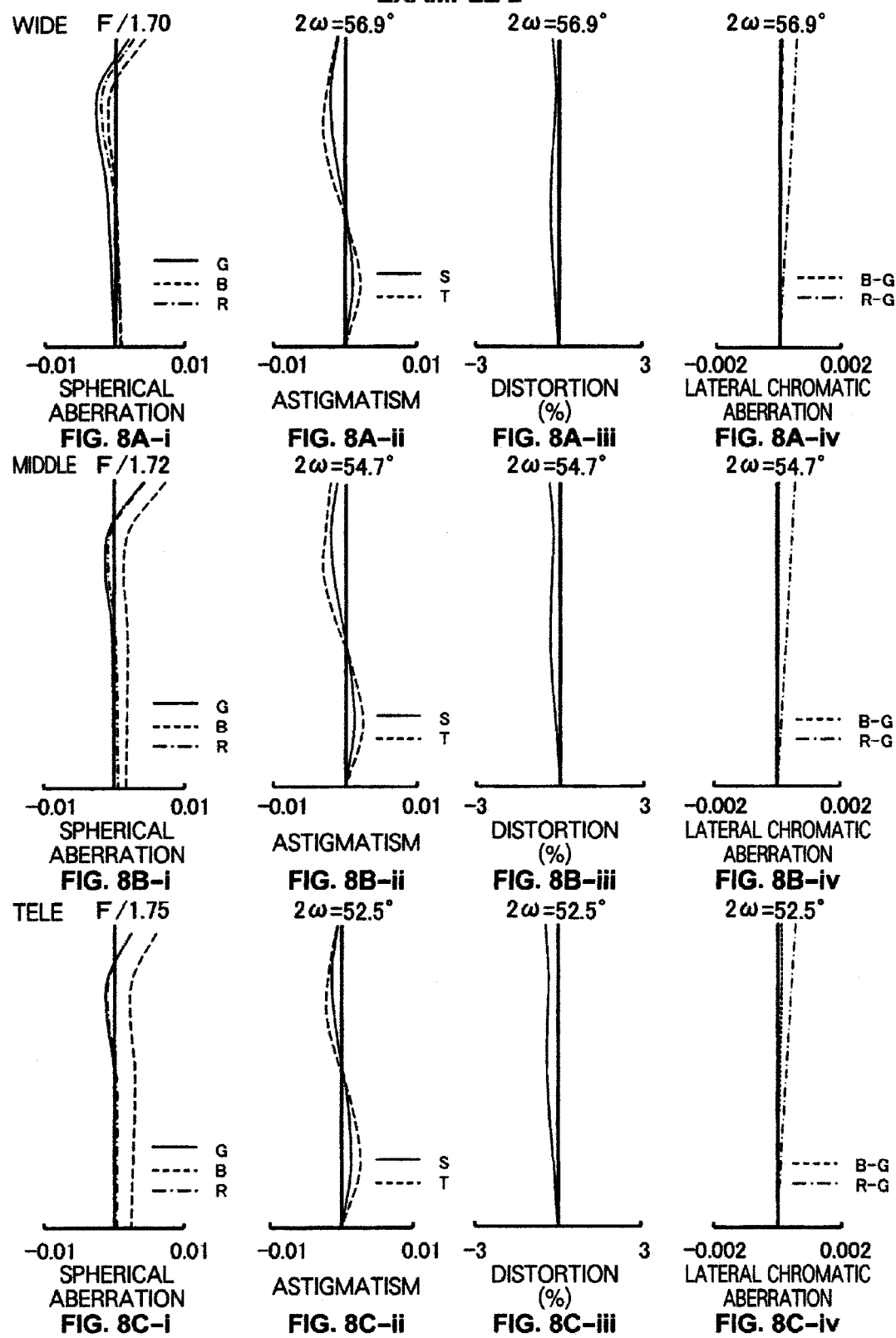
FIG. 8A-*i* is a diagram illustrating spherical aberration of the zoom lens for projection in Example 2 at wide end.
Figure 9:
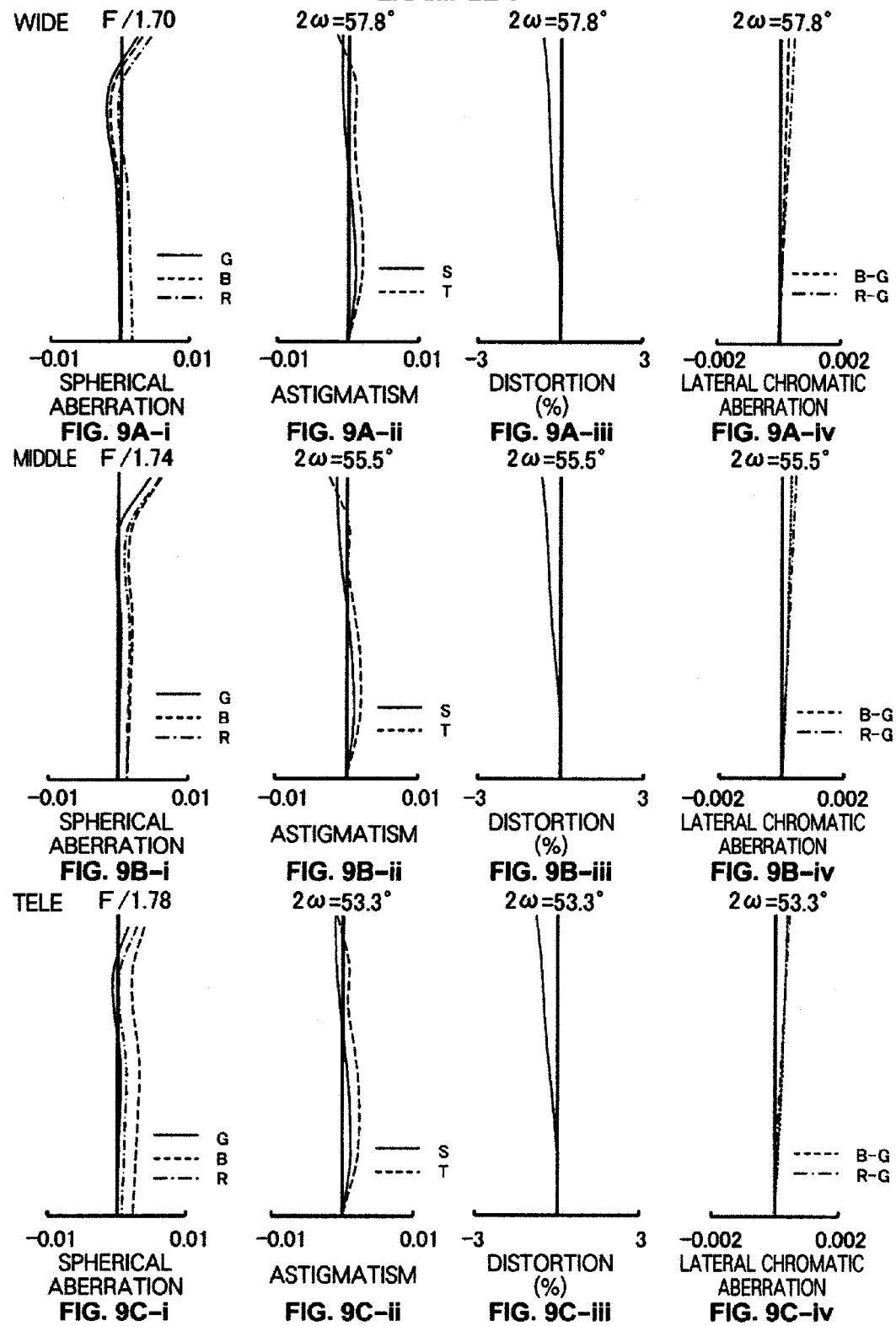
FIG. 9A-*i* is a diagram illustrating spherical aberration of the zoom lens for projection in Example 3 at wide end.

A zoom lens for projection in Example 3 is structured as illustrated in FIG. 5. Further, the path of movement of each movable lens group during zooming is illustrated in FIG. 6.

The zoom lens for projection in Example 3 is structured in a substantially similar manner to the zoom lens for projection in Example 1. However, the zoom lens for projection in Example 3 mainly differs from the zoom lens for projection in Example 1 in that both surfaces of the first lens $L_1$ are aspheric as in Example 1, but the first lens $L_1$ in Example 3 has double concave shape on optical axis Z, and that a stop 3 is not provided within the lens system.

The upper section of Table 3 shows curvature radius R of each lens surface, center thickness D of each lens and air space D between lenses, effective diameter, and refractive index $N_d$ and Abbe number $\nu_d$ of each lens for d-line in Example 3.

The middle section of Table 3 shows constants K and $A_3$ through $A_{10}$, which are aspheric coefficients corresponding to aspheric surfaces. Further, the lower section of Table 3 shows variable distance 1, variable distance 2 and variable distance 3 at wide end (wide), at middle position (middle), and at tele end (tele) when projection distance is 162.80. The variable distance 1 is a distance between the first lens group $G_1$ and the second lens group $G_2$. The variable distance 2 is a distance between the second lens group $G_2$ and the third lens group $G_3$. The variable distance 3 is a distance between the third lens group $G_3$ and the fourth lens group $G_4$.

TABLE 3

FOCAL LENGTH: 0.9956-1.0956, PROJECTION DISTANCE: 162.80,
ANGLE OF VIEW: 57.8-53.3 DEGREE, F-NUMBER: F1.70-1.76

| SURFACE NUMBER | R | D | EFFECTIVE DIAMETER | $N_d$ | $v_d$ |
|---|---|---|---|---|---|
| 1* | −3.526 | 0.2326 | 2.39 | 1.491000 | 57.5 |
| 2* | 971.077 | 0.2842 | 2.01 | | |
| 3 | 12.147 | 0.0930 | 1.97 | 1.516330 | 64.1 |
| 4 | 1.424 | **(VARIABLE 1) | 1.75 | | |
| 5 | 6.517 | 0.1696 | 1.53 | 1.805180 | 25.4 |
| 6 | 424.158 | 1.4985 | 1.51 | | |
| 7 | 1.521 | 0.2891 | 1.31 | 1.658440 | 50.9 |
| 8 | −19.429 | **(VARIABLE 2) | 1.28 | | |
| 9 | 1.498 | 0.0776 | 1.04 | 1.518230 | 58.9 |
| 10 | 0.920 | 0.6018 | 0.99 | | |
| 11 | −0.841 | 0.1008 | 0.99 | 1.784720 | 25.7 |
| 12 | 3.847 | 0.3915 | 1.19 | 1.497000 | 81.5 |
| 13 | −1.134 | 0.0155 | 1.31 | | |
| 14 | 7.260 | 0.3027 | 1.53 | 1.670030 | 47.2 |
| 15 | −2.064 | **(VARIABLE 3) | 1.57 | | |
| 16 | 2.726 | 0.2473 | 1.61 | 1.670030 | 47.2 |
| 17 | −12.864 | 0.5970 | 1.60 | | |
| 18 | ∞ | 1.5273 | | 1.518249 | 64.1 |
| 19 | ∞ | 0.1473 | | 1.460075 | 67.9 |
| 20 | ∞ | 0.0081 | | | |

*ASPHERIC SURFACE
*ASPHERIC COEFFICIENT

| SURFACE NUMBER FIRST SURFACE | K 1.000000 | $A_3$ 1.084027E−01 | $A_4$ 1.752057E−01 | $A_5$ 2.191280E−03 | $A_6$ −6.653746E−02 |
|---|---|---|---|---|---|
| | | $A_7$ −2.992334E−02 | $A_8$ 2.807925E−02 | $A_9$ 1.765431E−02 | $A_{10}$ −9.175447E−03 |
| SURFACE NUMBER SECOND SURFACE | K 1.000000 | $A_3$ 1.187270E−01 | $A_4$ 1.443946E−01 | $A_5$ 5.533425E−02 | $A_6$ −2.189696E−02 |
| | | $A_7$ −2.685417E−02 | $A_8$ −2.639156E−02 | $A_9$ −7.914161E−03 | $A_{10}$ 3.943842E−02 |

**VARIABLE DISTANCE

| | WIDE | MIDDLE | TELE |
|---|---|---|---|
| $D_4$ (VARIABLE 1) | 1.3547 | 1.2114 | 1.0760 |
| $D_8$ (VARIABLE 2) | 0.3503 | 0.3674 | 0.3939 |
| $D_{15}$ (VARIABLE 3) | 0.0386 | 0.1648 | 0.2736 |

Table 4 shows numerical values corresponding to the formulas in Example 3.

FIGS. 9A-i, 9A-ii, 9A-iii, and 9A-iv are diagram illustrating spherical aberration, astigmatism, distortion and lateral chromatic aberration of the zoom lens for projection in Example 3 at wide end (wide). FIGS. 9B-i, 9B-ii, 9B-iii, and 9B-iv are diagram illustrating spherical aberration, astigmatism, distortion and lateral chromatic aberration of the zoom lens for projection in Example 3 at middle position (middle). FIGS. 9C-i, 9C-ii, 9C-iii, and 9C-iv are diagram illustrating spherical aberration, astigmatism, distortion and lateral chromatic aberration of the zoom lens for projection in Example 3 at tele end (tele).

As Table 3 shows, the angle 2ω of view of the zoom lens for projection in Example 3 at wide end is 57.8 degrees, which is wide, and the F-number of the zoom lens for projection in Example 3 is 1.70, which is small (fast lens). Further, as FIGS. 9A-i through 9C-iv clearly illustrate, each aberration is corrected in an excellent manner.

Further, as Table 4 shows, the zoom lens for projection in Example 3 satisfies all of formulas (1) through (8), and formulas (1') through (7'), and formulas (1") through (4"), (6") and (7").

TABLE 4

| FORMULA NUMBER | FORMULA | EXAMPLE 1 | EXAMPLE 2 | EXAMPLE 3 |
|---|---|---|---|---|
| (1) | $F_{G3}/f_w$ | 28.4 | 27.4 | 129.5 |
| (2) | $|F_{G1}/f_w|$ | 2.0 | 2.0 | 2.1 |
| (3) | $F_{G2}/f_w$ | 2.0 | 1.7 | 2.0 |
| (4) | $F_{G4}/f_w$ | 3.4 | 3.5 | 3.4 |
| (5) | $bf/f_w$ | 1.71 | 1.68 | 1.72 |
| (6) | $β2w$ | −0.7 | −0.7 | −0.7 |
| (7) | $β3w$ | 1.5 | 1.6 | 1.6 |
| (8) | $Z_{R3}$ | 0.995 | 0.995 | 0.999 |

The zoom lens for projection of the present invention is not limited to the above-mentioned examples, and various modifications are possible without departing from the gist of the present invention. For example, the curvature radius R of each lens and axial surface distance D (center thickness D of each lens and air space D between lenses) is changeable in an appropriate manner.

As described above, the zoom lens for projection according to the embodiment of the present invention is composed of nine lenses including an aspheric lens arranged on the magnification side of the zoom lens for projection, and two-group-movable zoom method is adopted. Although the zoom lens for projection of the present invention is structured in such a manner, the zoom lens for projection of the present invention is a high resolution lens having a small F-number of approximately 1.7, and maintains the peripheral light amount of higher than or equal to 50%.

What is claimed is:

1. A zoom lens for projection, consisting of:
a first lens group having negative refractive power;
a second lens group having positive refractive power;
a third lens group having positive refractive power; and
a fourth lens group having positive refractive power, which are arranged from the magnification side of the zoom lens for projection in the order mentioned above,
wherein the first lens group and the fourth lens group are fixed during zooming, but the second lens group and the third lens group move on the optical axis of the zoom lens toward the magnification side, based on an operation for operating the zoom lens from a wide end to a tele end, in such a manner that a distance between the second lens group and the third lens group changes, and
wherein the following formula (1) is satisfied:

$$17 < F_{G3}/fw \qquad (1),\text{ where}$$

$F_{G3}$: focal length of the third lens group, and
fw: focal length of entire system at wide end.

2. The zoom lens for projection according to claim 1, wherein the following formula (2) is satisfied:

$$1.7 < |F_{G1}/fw| < 2.5 \qquad (2),\text{ where}$$

$F_{G1}$: focal length of the first lens group.

3. The zoom lens for projection according to claim 1, wherein the following formula (3) is satisfied:

$$1.4 < F_{G2}/fw < 2.3 \qquad (3),\text{ where}$$

$F_{G2}$: focal length of the second lens group.

4. The zoom lens for projection according to claim 1, wherein the following formula (4) is satisfied:

$$2.9 < F_{G4}/fw < 4.0 \qquad (4),\text{ where}$$

$F_{G4}$: focal length of the fourth lens group.

5. The zoom lens for projection according to claim 1, wherein the following formula (5) is satisfied:

$$1.4 \leq bf/fw < 2.2 \qquad (5),\text{ where}$$

bf: back focus.

6. The zoom lens for projection according to claim 1, wherein the following formula (6) is satisfied:

$$-1.0 < \beta 2w < -0.4 \qquad (6),\text{ where}$$

$\beta 2w$: magnification of the second lens group at the wide end.

7. The zoom lens for projection according to claim 1, wherein the following formula (7) is satisfied:

$$35 < \beta 3w < 1.80 \qquad (7),\text{ where}$$

$\beta 3w$: magnification of the third lens group at the wide end.

8. A projection-type display apparatus, comprising:
a light source;
a light valve;
an illumination optical unit that guides rays of light output from the light source to the light valve; and
a zoom lens for projection according to claim 1,
wherein the rays of light output from the light source are optically modulated by the light valve, and projected onto a screen by the zoom lens for projection.

9. A zoom lens for projection comprising:
a first lens group having negative refractive power;
a second lens group having positive refractive power;
a third lens group having positive refractive power; and
a fourth lens group having positive refractive power, which are arranged from the magnification side of the zoom lens for projection in the order mentioned above,
wherein the first lens group and the fourth lens group are fixed during zooming, but the second lens group and the third lens group move on the optical axis of the zoom lens toward the magnification side, based on an operation for operating the zoom lens from a wide end to a tele end, in such a manner that a distance between the second lens group and the third lens group changes,
wherein the following formula (1) is satisfied:

$$17 < F_{G3}/fw \qquad (1),\text{ where}$$

$F_{G3}$: focal length of the third lens group, and
fw: focal length of entire system at wide end,
wherein the first lens group is composed of a negative first lens, which is an aspheric lens made of plastic, and a negative second lens, which are arranged from the magnification side in the order mentioned above,
wherein the second lens group is composed of a positive third lens and a positive fourth lens, which are arranged from the magnification side in the order mentioned above,
wherein the third lens group is composed of a fifth lens, which is a negative meniscus lens having a convex surface facing the magnification side, a negative sixth lens having a concave surface facing the magnification side, a positive seventh lens having a convex surface facing the reduction side of the zoom lens, and a positive eighth lens, the fifth through eighth lenses being arranged from the magnification side in the order mentioned above, and the negative sixth lens and the positive seventh lens being cemented together to form a cemented lens, and
wherein the fourth lens group is composed of a positive ninth lens.

* * * * *